Dec. 17, 1957    F. WALLER ET AL    2,816,475
CAMERA FIELD INDICATIONS BY MEANS OF LIGHT BEAMS
Filed April 16, 1954    2 Sheets-Sheet 1
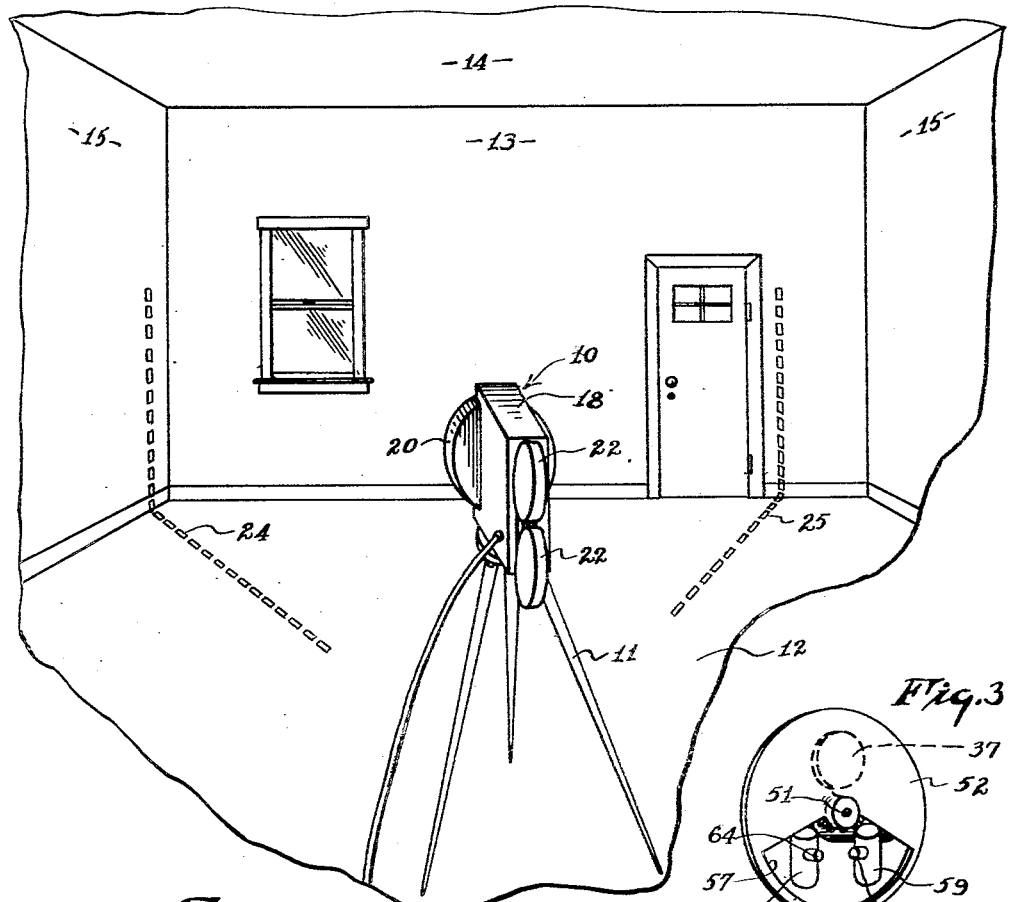
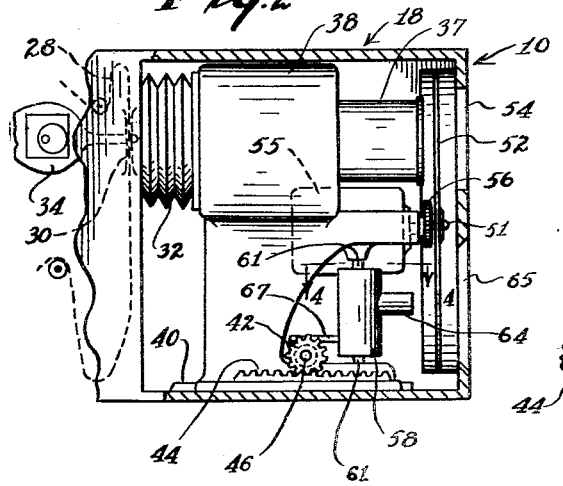
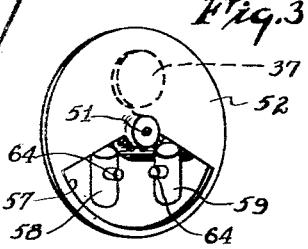
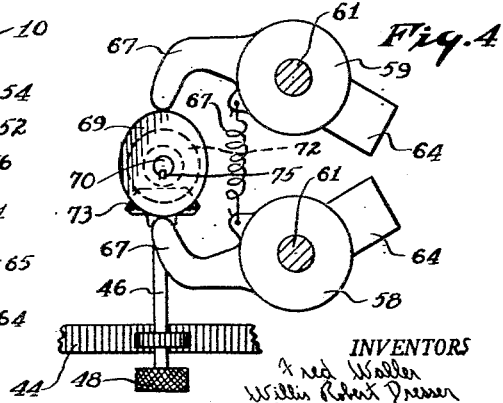
INVENTORS
Fred Waller
Willis Robert Presser
Richard C. Babish
BY Emery Varney
Whittemore & Dix
ATTORNEYS Dec. 17, 1957  F. WALLER ET AL  2,816,475
CAMERA FIELD INDICATIONS BY MEANS OF LIGHT BEAMS
Filed April 16, 1954  2 Sheets-Sheet 2
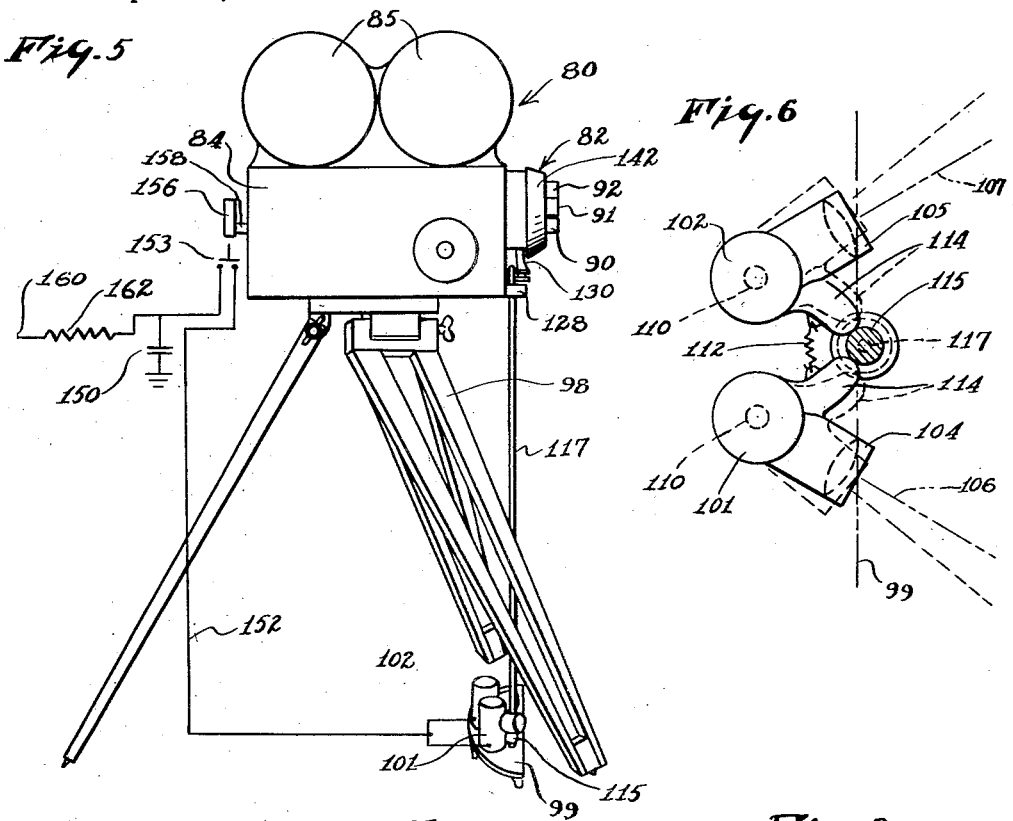
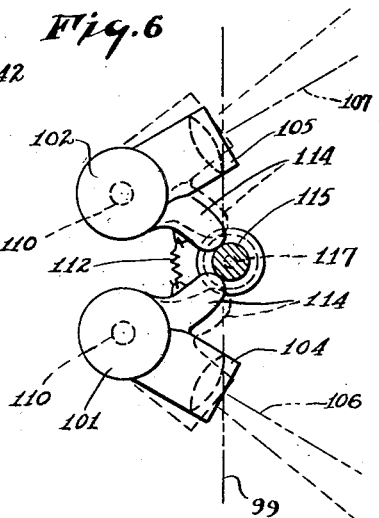
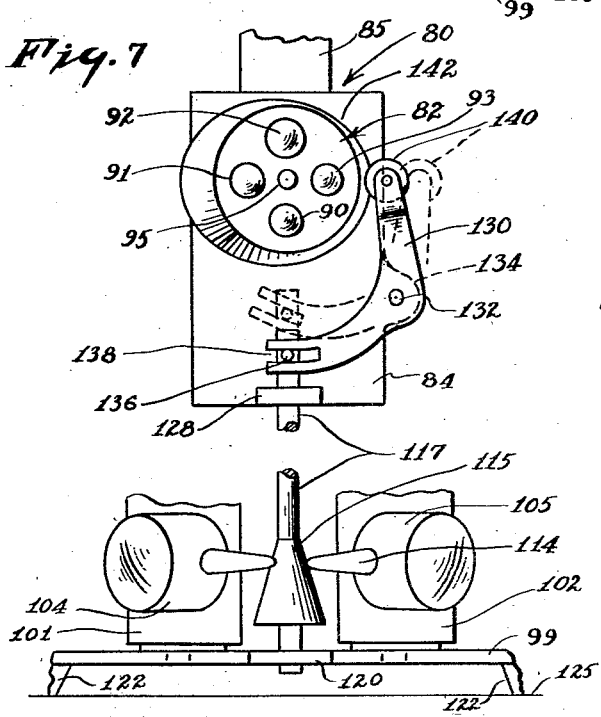
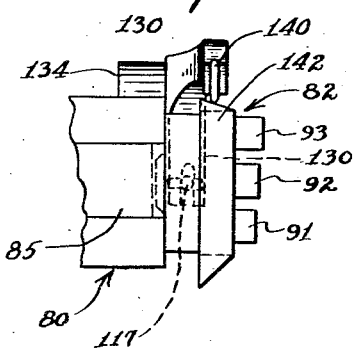

United States Patent Office 2,816,475
Patented Dec. 17, 1957

2,816,475

CAMERA FIELD INDICATIONS BY MEANS OF LIGHT BEAMS

Fred Waller, Huntington, N. Y., and Willis Robert Dresser, Long Hill, and Richard C. Babish, Norwalk, Conn., assignors to The Vitarama Corporation, Huntington, N. Y., a corporation of New York Application April 16, 1954, Serial No. 423,562

14 Claims. (Cl. 88—16)

This invention relates to cameras and more especially to methods and apparatus for indicating the limits of the field of a camera by means of light beams which are projected into the field in such a way as not to interfere with the operation of the camera.

When using either motion picture or television cameras with actors or equipment that move within the camera field, it is important for the actors, and for the director, to know the limits of the field embraced by the lens of the camera. This field changes to some extent with change of focus and it changes even more when the camera lens is changed, such as when substituting a long focal length lens for one of shorter focal length when a particular portion of a scene is to be made larger, for example in closeup work.

One object of the invention is to provide a method for indicating the limits of a camera field by projecting bright or colored lines or spots of light along the edges of the field during the time when the camera is "blind." In the case of a conventional motion picture camera, the lights are projected at the time when the lens is closed by the shutter while the film is being moved to the next exposure frame. In the case of electronic or television cameras, the light for indicating the field limits is projected into the field at the time when the picture tube is temporarily shut off for the transmission of the synchronization signals.

Another object of the invention is to shift the lines of the field limit illumination simultaneously with any change in focus or change in focal length of the lens so as to immediately indicate the new limits of the field.

Another object of the invention is to provide improved apparatus for projecting light beams along the limits of a camera field in synchronization with the periodic blind periods of the camera, and to provide apparatus for automatically changing the angle of divergence of the lines in accordance with changes in focus, and for also changing the lines to accommodate changes in lenses on cameras that have lens turrets.

Other objects, features and advantages of the invention will appear or be pointed out as the description proceeds.

In the drawing, forming a part hereof, in which like reference characters indicate corresponding parts in all the views;

Figure 1 is a perspective view of a motion picture camera located in a room with illuminated lines indicating the limits of the field covered by the camera;

Figure 2 is a simplified, diagrammatic view of the light projecting mechanism of the camera shown in Figure 1;

Figure 3 is a detail, perspective view showing the relationship to the camera shutter of the light projector;

Figure 4 is an enlarged fragmentary view taken on the line 4—4 of Figure 2;

Figure 5 is a side elevation showing a modified construction of the invention in which the camera has a lens turret;

Figure 6 is a greatly enlarged top view of the light projector adjustment mechanism of Figure 5;

Figure 7 is a greatly enlarged front view of the camera shown in Figure 5;

Figure 8 is a top plan view of the front portion of the camera shown in Figure 7.

Figure 1 shows a camera 10 supported on a tripod 11 which rests on a floor 12. The camera is located in a room having a back wall 13, a ceiling 14 and side walls 15.

The camera 10 includes a housing 18 with projecting portions 20 for enclosing the shutter of the camera. A film mechanism at the back of the camera includes reel holders 22. There is mechanism within the camera for feeding the film, intermittently, one frame at a time, to a film gate at which an exposure is made with each revolution of the shutter.

Within the camera housing 18 there are light projectors which project light beams 24 and 25 along the edges of the camera field. In the drawing, these light beams extend across the floor 12. The beam 24 extends part way up the left-hand side wall 15 and the other light beam 25 extends part way up the back wall 13. There is no advantage in having the light beams 24 and 25 reach to the ceiling.

These light beams 24 and 25 may be continuous, but they stand out more clearly in a lighted room if they are discontinuous, that is, made up of short lengths or spots of light. The pattern can be obtained by means of a mask or slide within each of the light projectors.

When the projectors are located within the camera housing 18, it is difficult to make the light beams 24 and 25 extend all the way to the area occupied by the tripod 11. Since the objects being photographed are never brought very close to the camera, there is no purpose in making the light projectors complicated by constructing them in such a way as to provide light beams that reach in close to the tripod.

In describing the light beams 24 and 25 as located at the limits of the camera field, it will be understood that the expression "limits" is used to designate the approximate line at which an object passes out of the field embraced by the camera lens, but, in practice, the lines 24 and 25 are preferably located just inside of the actual limit of the field so as to allow for manufacturing tolerances and minor variations in the adjustment of the apparatus, and to allow a small factor of safety in the use of the light beams by the actors.

Figure 2 shows a film 28 which is advanced through a film guide 30 to a film gate located behind a bellows 32. The film 28 is advanced with a periodic motion step by step, by means of claw mechanism 34. This structure is conventional, and no further illustration or description of its operation is necessary for a complete understanding of this invention.

The film is exposed by light entering through a lens in a lens assembly 37 carried by a mount 38 attached to the forward end of the bellows 32.

The amount 38 is adjustable along a guide 40 at the bottom of the camera housing 18. The mount 38 is adjusted, lengthwise of the guide 40, by a pinion 42 which meshes with a rack 44 attached to the mount 38. The pinion 42 is secured to a shaft 46, and the shaft is rotated by a manually operated knob 48 to focus the camera.

At the forward end of the mount 38, there is a support 51 on which a shutter 52 rotates. Light enters the camera housing 18 through an opening 54 in the front wall of the housing immediately in front of the lens assembly 37. The shutter 52 is driven by an electric motor 55 through gearing 56 and in timed relation with the film feed 34.

The shutter 52 has an opening 57, best shown in Figure 3, and this opening has an angular extent of somewhat less than 180° in the construction illustrated. Whenever the opening 57 is passing in front of the lens assembly 37, light enters the lens assembly to expose the film. This is in accordance with conventional practice.

The light beams from the camera come from projectors 58 and 59. These projectors are located within the camera below the support 51 on which the shutter 52 rotates and at a substantial distance below the axis of rotation of the shutter. When the shutter 52 is in the position shown in Figure 3, light beams from both of the light projectors 58 and 59 pass, without interruption, into the room in front of the camera. As the shutter 52 rotates in a counter-clockwise direction, it shuts off the light beams from the light projector 58, and then from the light projector 59, before admitting light into the lens assembly 37. Thus, synchronizing of the camera operation with the shutting off of the light beams is obtained in the camera illustrated in Figures 1–3, by using the same shutter to control the light projectors and the admission of light into the camera lens.

Referring again to Figure 2, the light projector 58 is supported by vertically extending upper and lower studs 61 rotatable in bearings in the focusing mount 38. The projector 58 contains a light and has a lens barrel 64 from which the light is projected through an opening 65 in the front wall of the camera housing 18. Since the studs 61 are carried by the focusing mount 38, it will be evident that the light projectors 58 and 59 advance and retreat with the lens assembly 37 as the latter is adjusted to focus the camera.

Both of the light projectors 58 and 59 (Figure 4) have rearwardly extending arms 67 which serve as cam followers for rotating the light projectors 58 and 59 about the vertical axes of the studs 61. The rearward ends of the light projectors 58 and 59 are urged toward one another by a spring 68 which is connected at its opposite ends with lugs on the projectors 58 and 59. The pressure of this spring 68 holds the cam-follower arms 67 in contact with a cam 69 attached to a vertical shaft 70.

The shaft 70 has a bevel gear 72 secured to its lower portion, and the bevel gear 72 meshes with another bevel gear 73 on the shaft 46 so that rotation of the shaft 46, to change the focus of the camera, turns the cams 69 and changes the angle of convergence of the optical axes of the light projectors 58 and 59.

The cam 69 is shaped so as to vary the included angle between the light beams, from the projectors 58 and 59, in a way which maintains the field between the beams equal to the field embraced by the lens when focused for different distances. The cam 69 is preferably connected with the shaft 70 by a key 75 which is removable for replacing the cam 69 with another cam whenever the camera lens is replaced by another lens having different characteristics relating to the field which it includes at different positions of focus. The key 75 is merely representative of detachable means for connecting the cam 69 to the shaft 70.

Figure 5 shows a modified form of the invention in which a camera 80 is equipped with a lens turret 82. The camera 80 has a housing 84 with a film reel holder 85 at its upper end. The camera contains mechanism for feeding the film intermittently, as in the case of the camera illustrated in the preceding figures.

The lens turret 82 contains four lenses, 90, 91, 92 and 93. The turret is rotatable about a supporting stud 95 and is adjustable along the axis of the stud 95 to focus the camera. Each of the lenses 90–93 is of different focal length, and the different lenses are brought into operative position at different times, depending upon the subject matter being photographed.

In the camera illustrated, the lens which is located in the upper position, in Figure 7, is the one which is in alignment with the gate at which the film is exposed. The turret 82 has releasable locking means for holding it in position with any of the lenses 90–93 in front of the film gate, in accordance with conventional practice in lens turret cameras.

Referring again to Figure 5, the camera 80 is supported by a tripod 98, and there is a base 99, located on the floor beneath the tripod, for holding light projectors 101 and 102. These light projectors have lens barrels 104 and 105 (Figure 6) with optical axes 106 and 107 along which the light beams are directed.

Each of the projectors 101 and 102 is supported from the base 99 and is angularly movable about the axis of a stud 110 to change the angle of divergence of the axes 106 and 107.

The light projectors 101 and 102 are connected by a spring 112, and each of the light projectors has an arm 114 with an end portion which serves as a cam follower.

The end portions of the arms 114 are held in contact with a cam 115 by the tension of the spring 112. The cam 115 is secured to a vertical shaft 117 which raises and lowers the cam in a manner which will be described.

The cam 115 is of different diameter at different sections along its height, as shown in Figure 7. The shaft 117, below the cam 115, extends through a bearing 120. At the front of the base 99 the shaft 117 is freely slidable, in the direction of its longitudinal axis, in the bearing 120. The base 99 has legs 122 for supporting it on the floor 125. This provides clearance for a substantial vertical movement of the shaft 117 without striking the floor.

As the shaft 117 moves the cam 115 upwardly, the increasing cross section of the cam displaces the cam-follower arms 114 and causes the lens barrels 104 and 105 to turn away from one another and cause a greater divergence of the light beams. Conversely, downward movement of the cam 115 permits the light projectors 101 and 102 to turn toward one another, under the influence of their connecting spring 112 (Figure 6) and this reduces the angle included between the light beams which are projected along the axes 106 and 107.

Figure 7 shows the apparatus by which the shaft 117 is raised and lowered. The upper end of the shaft 117 slides freely in a bearing 128 located on the front of the housing 84. There is a bell-crank 130 supported on the housing 84 by an axle 132 extending from a lug 134 on one side of the camera housing. The lower end of the bell-crank 130 is shaped to form a yoke which embraces the upper end of the shaft 117, and there is a pin 136 extending through the shaft 117 and into slots 138 in the opposite sides of the yoke at the lower end of the bell-crank 130.

At the upper end of the bell-crank 130 there is a roller 140 which is a cam follower for a cam 142 located around the periphery of the lens turret 82. This cam 142 is shaped to displace the cam follower 140 and shift the shaft 117 by an amount which changes the angle between the beams from the light projectors.

The cam 142 is shaped so that when a particular lens is in operative position in front of the film gate, the cam follower 140 is at the displacement which produces the proper divergence of the light beams for that particular lens. It will be evident that it makes no difference where the cam follower 140 is located with respect to the operative lens, provided that the cam 142 is at a corresponding angular position with respect to the turret and the operative lens. The displacement of the cam follower 140 at intermediate positions of the turret, that is, while the turret is moving through the angle necessary to bring the next lens into alignment with the film gate, is of no particular significance; and the cam is designed so as to have a gradual change from one radius to another along these intermediate angular positions.

In order to change the divergence of the light beams to accommodate changes in the focus of each lens, the cam 142 is shaped so as to have different radii at different sections lengthwise of the axis along which the turret is moved to focus the camera. Figure 8 shows this construction. As the lens turret 82 moves toward the right in Figure 8, to focus on objects closer to the camera, the cam 142 displaces the cam follower 140 to change the included angle between the light beams in a way that compensates for the change in the field embraced by the lens at the new focus.

The light sources in the light projectors 101 and 102 are preferably of the type that give a short and intense flash of light when energized from a capacitor 150 which is connected with the projectors 101 and 102 by a conductor 152 and through a switch 153.

The switch 153 is of the momentary contact type with a bias toward open position, and there is a cam 156 at the back of the camera for periodically closing the switch 153. This cam 156 is secured to a shaft 158 which is connected with the shutter operating mechanism of the camera so that the switch operates in timed relation with the shutter.

The capacitor 150 is charged from a source of electric power, indicated by the reference character 160, through a resistance 162 which is low enough to permit rapid charging of the capacitor 150 between successive closings of the camera shutter.

The preferred embodiments of the invention have been illustrated and described, but changes and modifications can be made and some features can be used in different combinations without departing from the invention as defined in the claims.

We claim as our invention:

1. The method of indicating the field included by a motion picture camera lens during operation of the camera, which method comprises periodically rendering the camera lens ineffective to transmit a picture, and during a period when the lens is ineffective, delineating the field of view of the camera by projecting beams of light along lines extending from the region of the camera in directions away from the camera along the edges of the field included by the camera lens, extinguishing the light beams before the camera lens again becomes effective, and repeating the projecting and the extinguishing of the light beams in timed relation with successive periods of effectiveness of the lens to take advantage of the persistence of vision phenomena and obtain beams that provide guides for the actors and director while the motion picture is being made.

2. The method of indicating the field of a motion picture camera which operates with successive intermittent periods during which no picture is transmitted by the camera, which method comprises projecting diverging light beams from the region of the camera, during a period when no picture is being transmitted, with the light beams directed along opposite edge regions of the field embraced by the camera to delineate said field, extinguishing the light beams before the next picture is transmitted, and repeating the projecting and the extinguishing of the light beams in timed relation with successive periods of transmission of the picture to take advantage of the persistence of vision phenomena and obtain beams that provide guides for the actors and director while the motion picture is being made, focusing the lens as required by changes in the principal subject matter to be pictured by the camera, and changing the angle of divergence of the light beams simultaneously with changes in the focus of the lens and in proportion to the change in the angle of the picture field resulting from the change in focus.

3. The method of indicating the field of a motion picture camera lens which comprises periodically shutting off the passage of light through the lens, delineating the field of view of the camera by projecting diverging light beams along lines extending away from the camera at the opposite edges of the field embraced by the lens and during a period when the light through the lens is shut off, extinguishing the light beams before the next passage of light through the lens, and repeating the projecting and the extinguishing of the light beams in timed relation with successive periods of passage of light through the lens to take advantage of the persistence of vision phenomena and obtain the beams that provide guides for the actors and directors while the motion picture is being taken, changing the focus of the lens from time to time, and simultaneously changing the angle of divergence of the light beams in accordance with changes in the angle of divergence of the field imaged by the lens at the different positions of focus.

4. The method of indicating the field of a moving picture camera which is equipped with interchangeable lenses of different focal length and which is operated with recurring intervals during which no picture is transmitted from the lens, which method comprises projecting diverging beams of light into the field of the lens during one of said intervals and along lines extending from the camera adjacent to the opposite edges of the field embraced by the lens to delineate said field, extinguishing the light beams before the next picture is transmitted, and repeating the projecting and the extinguishing of the light beams in timed relation with successive periods of transmission of the picture to take advantage of the persistence of vision phenomena and obtain beams that provide guides for the actors and directors while the motion picture is being made, moving different lenses into operative position in the camera in accordance with changes in the principal subject matter to be pictured, and changing the angle of divergence of the light beams simultaneously with the changes in the lens and by an angle that compensates the difference in angle of divergence of the fields of the lenses of different focal length, and delineating the field of the different lenses in the same way as the first lens.

5. The combination with a moving picture camera having a lens and repetitive means for producing recurring blind periods between successive picture making exposures and during which the camera is unaffected by the illumination of the field embraced by the camera lens, of light projector means that project lines of light along the edge portions of the camera field to delineate the field of view of the lens, and synchronizing means that control the projection of light from the light projector means in timed relation with the blind periods of the camera, and that shut off the light beams temporarily during each successive picture making exposure.

6. Picture making apparatus comprising a moving picture camera having a lens and a shutter that stops passage of light through the lens to the focal plane of the camera when the shutter is in closed position, the shutter being operable to control passage of light for picture making by the camera, light projector means including elements that direct diverging light beams along opposite edges of the camera field to delineate the field of view of the lens, other means for turning the light beams off and on, and a synchronizing control that times the turning on and shutting off of the light beams with each closing and opening, respectively, of the shutter of the camera, to take advantage of the persistence of vision phenomena and thereby delineate the camera field during the making of the moving picture.

7. Picture making apparatus including a camera having a lens, a rotary shutter extending across the path of a light beam through the lens and having an opening of predetermined angular extent through which the light beam passes during a portion of each revolution of the shutter, projector means for directing diverging light beams from the camera along lines adjacent to the edges of the field embraced by the camera lens, and supporting means on which the projectors are located behind the rotary shutter and in position to be covered by the shutter to shut off the light while the opening in the shutter is in line with the lens.

8. The picture making apparatus described in claim 7 characterized by projectors with masking means therein for producing lines of light which consist of disconnected spots of light along the limits of the lens field.

9. Moving picture making apparatus including a moving picture camera having a lens and automatically operating timing means for producing recurring blind periods during which the camera is unaffected by the illumination of the field embraced by the lens, light projector means for delineating the field of view of the camera by projecting diverging lines of bright light along the opposite edges of the field embraced by the lens, light beam controls responsive to the automatically operating timing means for extinguishing the light beams after each cycle of the automatically operating timing means and again projecting the light beams during each recurring blind period of the camera, and a device for moving at least a portion of the projector means to change the angle of divergence of the lines of light to accommodate changes in the focus of the lens.

10. The moving picture making apparatus described in claim 9 and in which the camera includes means for changing the focus of the lens, and said device includes motion-transmitting connections between the lens-focusing means and the movable portion of the projector means to change the angle of divergence of the lines of light to compensate the change in the lens field resulting from the change in focus.

11. The moving picture making apparatus described in claim 9 and in which the camera is equipped with a lens turret having lenses of different focal length movable selectively into operative positions, and said device includes motion-transmitting connections between the lens turret and the light projector means including a cam element which changes the angle of divergence of the lines of light, the cam element being shaped to compensate the changes in the angle of divergence of the fields of the different lenses carried by the turret.

12. The moving picture making apparatus described in claim 9 and in which the camera has means for focusing the lens, and said device includes motion-transmitting connections between the focusing means and the projector means including a cam that moves the projector means to change the angle of divergence of the lines of light, the cam being shaped to compensate the change in the angle of divergence of the camera lens with changes in the focus of the camera lens.

13. The moving picture making apparatus described in claim 9 and in which the camera has means for focusing the lens, and said device includes motion-transmitting connections between the focusing means and the projector means including a cam that moves the projector means to change the angle of divergence of the lines of light, the cam being shaped to compensate the change in the angle of divergence of the camera lens with changes in the focus of the camera lens, and in which the cam element is removably connected with the motion-transmitting connections for replacement by another cam in the event of replacement of the camera lens by another lens having different optical characteristics.

14. The moving picture making apparatus described in claim 9 and in which the camera is equipped with a movable support having lenses of different focal length thereon for movement into operative position on the camera, and the camera has means for changing the focus of any lens which is in operative position, and said device includes motion-transmitting connections between the light projector means and both the lens support and the focusing means for moving the light projector means to change the angle of divergence of the lines of light in accordance with changes in both the lens and focus of the camera.

References Cited in the file of this patent

UNITED STATES PATENTS

| | | |
|---|---|---|
| 1,777,419 | Ross | Oct. 7, 1930 |
| 2,061,652 | De Roode | Nov. 24, 1936 |
| 2,157,548 | Leitz | May 9, 1939 |
| 2,166,419 | O'Neill | July 18, 1939 |
| 2,239,379 | Bucky | Apr. 22, 1941 |
| 2,282,045 | Fleischer | May 5, 1942 |
| 2,343,015 | Lewis | Feb. 29, 1944 |
| 2,415,424 | Gaebel | Feb. 11, 1947 |